(12) United States Patent
Stadlmann

(10) Patent No.: US 11,179,882 B2
(45) Date of Patent: Nov. 23, 2021

(54) SYSTEM AND METHOD FOR GENERATING A THREE-DIMENSIONAL BODY

(71) Applicant: Klaus Stadlmann, Vienna (AT)

(72) Inventor: Klaus Stadlmann, Vienna (AT)

( * ) Notice: Subject to any disclaimer, the term of this patent is extended or adjusted under 35 U.S.C. 154(b) by 209 days.

(21) Appl. No.: 16/087,593

(22) PCT Filed: Mar. 23, 2017

(86) PCT No.: PCT/AT2017/060073
§ 371 (c)(1),
(2) Date: Sep. 21, 2018

(87) PCT Pub. No.: WO2017/161398
PCT Pub. Date: Sep. 28, 2017

(65) Prior Publication Data
US 2019/0047213 A1  Feb. 14, 2019

(30) Foreign Application Priority Data
Mar. 25, 2016  (AT) .............................. A 50247/2016

(51) Int. Cl.
*B29C 64/135* (2017.01)
*B29C 64/20* (2017.01)
(Continued)

(52) U.S. Cl.
CPC ............ *B29C 64/135* (2017.08); *B29C 64/20* (2017.08); *B29C 64/218* (2017.08);
(Continued)

(58) Field of Classification Search
CPC ..... B29C 64/135; B29C 64/223; B29C 64/20; B29C 64/393; B29C 64/218; B29C 67/244; B33Y 10/00
(Continued)

(56) References Cited

U.S. PATENT DOCUMENTS 4,996,010 A    2/1991  Modrek
5,425,848 A *  6/1995  Haisma ................. B29C 39/148
                                                      216/48

(Continued)

FOREIGN PATENT DOCUMENTS

CA         2 054 276 A1    4/1992
DE    10 2013 102 377 A1    9/2014
(Continued)

OTHER PUBLICATIONS

International Search Report and Written Opinion of the International Searching Authority for International Patent Application No. PCT/AT2017/060073 dated Jun. 20, 2017, 13 pages.

*Primary Examiner* — Matthew J Daniels
*Assistant Examiner* — Gregory Chad Grosso
(74) *Attorney, Agent, or Firm* — Merchant & Gould P.C.

(57) ABSTRACT

A system (1) for constructing a component, contains a trough (13) with an at least partly transparent base (23), an at least partly stretchable semipermeable layer (7), for receiving a photosensitive substance (5), and a phase (9) arranged below the semipermeable layer (7) and forms an intermediate layer (11) within the photosensitive substance (5). A light source (25) is below the trough base (23) for curing the photoreactive substance (5) in some regions. A construction platform (31) is above the semipermeable layer (7) and can be lifted and lowered for receiving the component (3), as well as with a driver (15) which extends from the semipermeable layer (7) in the direction of the construction platform (31) and can be moved relative to the trough base (23) to convey the photoreactive substance (5) into a gap (20) between the construction platform (31) and the semipermeable layer (7).

19 Claims, 10 Drawing Sheets

(51) Int. Cl.
  *B29C 64/223*   (2017.01)
  *B29C 64/393*   (2017.01)
  *B29C 64/218*   (2017.01)
  *B29C 67/24*    (2006.01)
  *B33Y 10/00*    (2015.01)

(52) U.S. Cl.
  CPC .......... *B29C 64/223* (2017.08); *B29C 64/393* (2017.08); *B29C 67/244* (2013.01); *B33Y 10/00* (2014.12)

(58) Field of Classification Search
  USPC ....................................................... 264/401
  See application file for complete search history.

(56) References Cited

U.S. PATENT DOCUMENTS

| | | | | |
|---|---|---|---|---|
| 2010/0262272 | A1* | 10/2010 | Shkolnik | B33Y 50/02 |
| | | | | 700/120 |
| 2015/0034007 | A1 | 2/2015 | Fischer et al. | |
| 2016/0046080 | A1* | 2/2016 | Thomas | B29C 64/135 |
| | | | | 264/308 |
| 2016/0059487 | A1* | 3/2016 | DeSimone | B29C 64/124 |
| | | | | 264/401 |

FOREIGN PATENT DOCUMENTS

| | | | |
|---|---|---|---|
| DE | 10 2013 215 040 A1 | 2/2015 | |
| EP | 2 505 341 A1 | 10/2012 | |
| WO | 2015/164234 A1 | 10/2015 | |
| WO | WO2015164234 | * 10/2015 | ............. B29C 67/00 |

\* cited by examiner

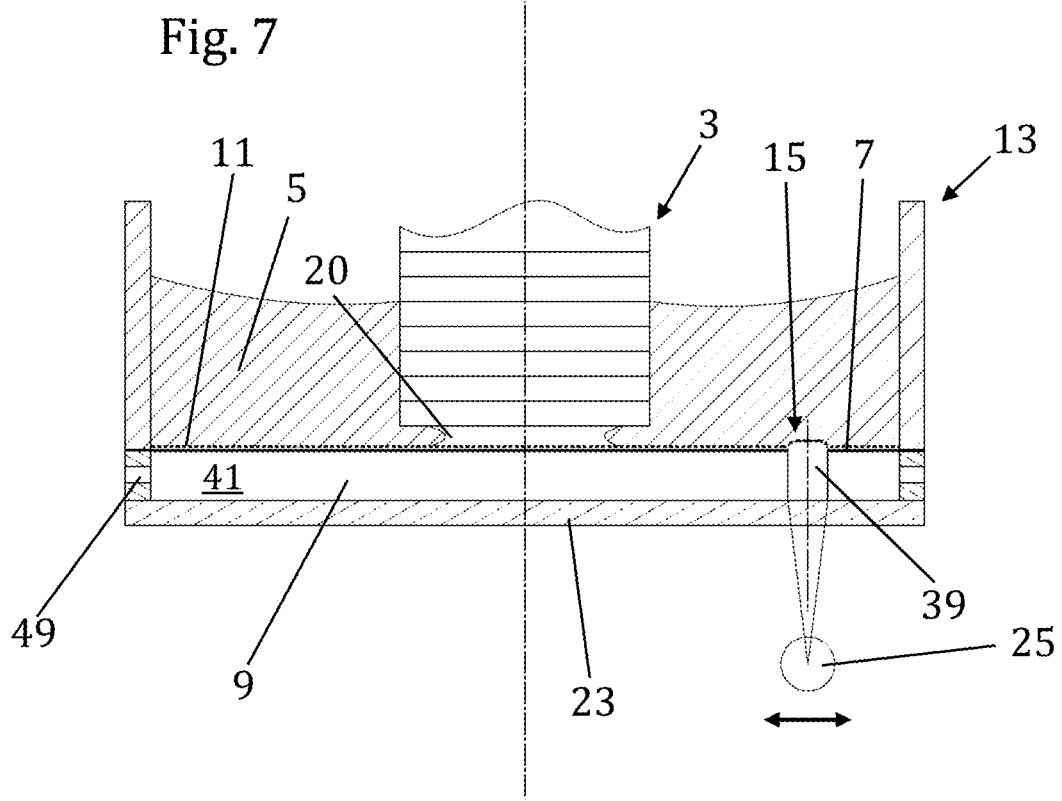

SYSTEM AND METHOD FOR GENERATING A THREE-DIMENSIONAL BODY

This application is a National Stage Application of PCT/AT2017/060073, filed 23 Mar. 2017, which claims benefit of Serial No. A 50247/2016, filed 25 Mar. 2016 in Austria, and which applications are incorporated herein by reference. To the extent appropriate, a claim of priority is made to each of the above-disclosed applications.

BACKGROUND OF THE INVENTION

The invention relates in general to a stereolithography system for a continuous and/or non-continuous construction of a three-dimensional body in a layer-by-layer manner.

More precisely, the invention relates to a system for constructing a component, containing a trough with an at least partly transparent base, an at least partly stretchable semipermeable layer for receiving a photosensitive substance, and a phase which is arranged below the semipermeable layer and which is able to form an intermediate layer within the photosensitive substance, a light source which is arranged below the trough base for curing the photoreactive substance in some regions, and a construction platform which is arranged above the semipermeable layer and which can be lifted and lowered with respect thereto, for receiving the component or the individual component layers.

The at least one light source which is movable below the trough at least in one direction is provided for the controlled curing of the respective light-sensitive substance through a chemically inert phase, or a phase which is not sensitive to light, and/or an intermediate phase.

In this connection the aim is to generate a three-dimensional object in a—in dependence on the present geometric shaping of the partial layer—continuous or non-continuous manner by using the semipermeable layer, as well as also a three-dimensional body which will be integrated in such a system or trough.

The generation of three-dimensional (3D) bodies by means of light-curable substances, as for instance a photoresin, which are cured layer by layer, wherein the cross-section information is generated by a mask projection method or by a laser source, is known under all kinds of names, as for instance 3D printing, additive manufacturing or rapid prototyping. In generative production machines which enable a continuous printing process there are mostly used pixel-controlled DLP lasers, MEMS lasers or controllable lasers for the exposure to light of the cross-section or of the layers. In this connection, by the exposure to light a solid layer is generated from the liquid photosensitive substance. Said solid layer adheres to a support and is detached or removed from a reference surface by lifting the support. Thus, a three-dimensional body is formed successively from the photosensitive substance.

From prior art there are known solutions which describe the pull-off or removal forces in a stereolithography process during the separation procedure of differently formed reference surfaces and which disclose a continuous printing process. In systems which provide for an exposure to light from below, see for instance DE 10 2013 215 040 A1, one of the greatest problems is the removal or detachment of the just generated component layers without destroying the component thereby and allowing that a new photosensitive liquid will flow into the gap between the component layer and the reference surface. When the component is severed from the base plate of the trough such that a secure removal is possible, this has negative effects on the speed of the construction process. In the literature, as for instance in CA 2 054 276 A1, there are described various methods for removing the component layer from a trough base; in this regard, for instance silicone layers, separating foils and the like are used. By said methods there is, however, not allowed any continuous process, and, thus, they increase the times of construction for the object. In this connection, however, component surfaces of almost any size can be generated, as by the height of the return stroke and the introduction of a waiting time the possibility is provided that a new photoreactive substance can continue to flow thereinto.

In recent literature there can be found systems which are able, for instance by using a multiphase system, to facilitate a continuous construction process. In this connection there will only be a small return stroke which is effected continuously. Thereby the height of the gap which is formed for the flow of the photoreactive substance lies within the order of magnitude of the desired layer thickness. In particular in case of large component surfaces this results in an insufficient transport of new photosensitive liquid into the gap. When multiphase systems are used, the boundary surface is also unstable, and a formation of corrugations or rippling or the like can occur.

One example for such a technique is described in U.S. Pat. No. 4,996,010 A. Therein, a trough for receiving a photosensitive liquid is provided in which also a substance which is insensitive to light is disposed as a layer below the photoreactive substance. The exposure to light is carried out from below through the layer which is insensitive to light, and the curing of the layer takes place at the phase boundary of the two layers. The advantage of such an arrangement lies in the minimization of the necessary force which is required for the separation of the just cured layer.

WO 2015/164234 A1 shows a system with several immiscible chemical phases, wherein the photosensitive layer is positioned above an unreactive carrier phase. Said arrangement is also used for the continuous generation of a three-dimensional object. In this regard, the lower phase has to have a higher density than the light-sensitive substance disposed as a layer thereon.

In DE 10 2013 102 377 A1 there is disclosed a further multi-phase system in which a component is moved along the phase boundary in order to level the phase boundary. Said component is in direct contact with both phases and is able to correct interactions between the phases which are dependent on the component cross-section. Said arrangement has, however, disadvantages with regard to the handling during operation. Also the speed at which the component can move along the phase boundaries is restricted by flow effects.

EP 2 505 341 A1 discloses a technique for a layered construction of an object made of a photopolymerizable material, in which an elongated element, in particular a rod or a wire, is moved through the photopolymerizable material. Said element only has a mixing function.

The known techniques have the disadvantage, among others, that in case of the non-continuous generation of a component an indentation pad is produced in the carrier phase in dependence on the geometric layer information, which leads to a distortion or to an accummulating defect in the component. The lower carrier phase also has to have a higher density than the photosensitive substance disposed as a layer thereon. Furthermore, in the non-continuous operation the process speed is restricted by the component which is movable along the phase boundary. Also the material of which the component which moves along the phase boundaries consists is restricted by the chemical properties of both phases (corrosion). Moreover, the cleaning of the component as well as of the trough is quite expensive. The process stability in case of a direct contact of two phases leads to undesired effects during the entire process time, for instance to inclusions of the carrier phase in the cured component layer as well as to a component quality which is dependent on the cross-section.

SUMMARY OF THE INVENTION

The invention has the objective to create a system of the kind mentioned at the beginning, in which the above-mentioned disadvantages are eliminated, and by means of which an easier, quicker, exact, continuous and/or non-continuous as well as economic generation of three-dimensional bodies is facilitated also in case of low layer thicknesses and large exposure areas. In particular the problem of the transport of a new photosensitive substance into the gap which is caused by the lifting of the layer formed last shall be solved, and in this regard the system shall be able to arbitrarily change between a continuous process and a non-continuous process, wherein also an increase of the profitability of the system shall be achieved.

Therefore, the inventive system of the kind mentioned at the beginning is characterized by at least one driver which extends at least from the semipermeable layer in the direction of the construction platform and can be moved relative to the trough base for a transport effect in order to convey the photoreactive substance by an induced flow into the gap between the construction platform and the semipermeable layer.

Advantageous embodiments or further developments are indicated in the dependent claims.

In the present stereolithography system there is provided a semipermeable layer (as for instance a foil) which facilitates that the chemical phase—which is positioned below the semipermeable layer and can be present in different states of aggregation in dependence on the used phase (gaseous or liquid)—can diffuse through the semipermeable layer in order to interact with the photosensitive layer which is arranged over the semipermeable layer. In doing so, for instance a thin layer is formed within the photosensitive substance by an oxygen inhibition, said thin layer having a photoreactivity which differs from that of the remaining photosensitive substance.

By means of the semipermeable layer there is also created a transport ability so that a new photoreactive substance can be conveyed into the gap formed between the semipermeable layer and the component layer formed last. This is in particular enabled by a geometric driver shaping of the semipermeable layer, wherein said shaping can be realized by the foil itself, by at least one geometric elevation which is provided at the semipermeable layer, by a movable element arranged below or above the semipermeable layer, or by a controlled deformation of the foil for instance by a vibration or a vacuum. The desired transport effect can also be effected by a combination of the driver formations described herein. The transport of a photoreactive liquid can for instance be facilitated by a relative movement or by a movable bulge of the semipermeable layer. Preferably, the semipermeable layer is in a stretched state which guarantees that a smooth and even component surface can be produced.

Either the semipermeable layer can directly form a base of the trough, or an additional at least partly transparent base can be provided. The trough is used for the reception and/or the interaction of at least one photoreactive substance and an at least partly transparent phase which is not photoreactive. In particular, the semipermeable layer is situated within the trough, or a majority of said layer is in contact with the photosensitive liquid. At least one side of the semipermeable layer can at least partly come into contact with a chemical substance; preferably, both sides of the semipermeable layer come into contact with different chemical phases.

The trough can comprise openings through which the semipermeable layer runs, wherein the openings are formed such that substantially no photoreactive substance or other liquids or gases can emerge. Said arrangement allows for a movement of the semipermeable layer relative to the trough and/or component layer, wherein the drive (or parts thereof) is not in contact with the photoreactive substance or the like and can also be provided outside of the trough arrangement. The trough can have several chambers or regions which facilitate that different phases can interact with the semipermeable layer, and that a movement of the semipermeable layer—with an interaction (diffusion) at the same time—is facilitated in a manner which is simple, compact and modular.

The enrichment or diffusion of the semipermeable layer for the formation of a photochemically inactive intermediate layer in the photoreactive substance can be carried out also outside the region in which the semipermeable layer is in contact with the light-curable substance, particularly preferably in the region in which the semipermeable layer is in contact with the photosensitive substance.

By means of or through the semipermeable layer there can also be created a geometric form which creates a geometric driver elevation which is positioned for instance in the region of the layer thickness of the component or below, but is formed such that, as already mentioned, it allows for a transport possibility for the photoreactive substance. Preferably, the geometric elevation can be adjusted automatically by a control unit to an optimum height that results for instance from process parameters like the layer thickness, the transport speed, the viscosity of the photoreactive substance and the like. Thereby an efficient and intelligent conveyance of the photoreactive substance is facilitated, wherein the photoreactive substance can also be paste-like.

In this regard, the securing of the transport of the photosensitive substance can be effected in each described variant by at least one complete traversing or passing-through of the geometric elevation.

BRIEF DESCRIPTION OF THE DRAWINGS

In the following, the invention will be explained in further detail by means of preferred embodiments represented in the drawings, to which the invention shall, however, not be restricted. In the drawings there is shown in:

FIG. 3*a*' a partial detailed view of FIG. 3*a*;

FIG. 7 still another embodiment of the invention in which a movable light source is provided and in which the transport element is designed to be transparent for radiation.

DETAILED DESCRIPTION OF THE PREFERRED EMBODIMENT

Figure 1:
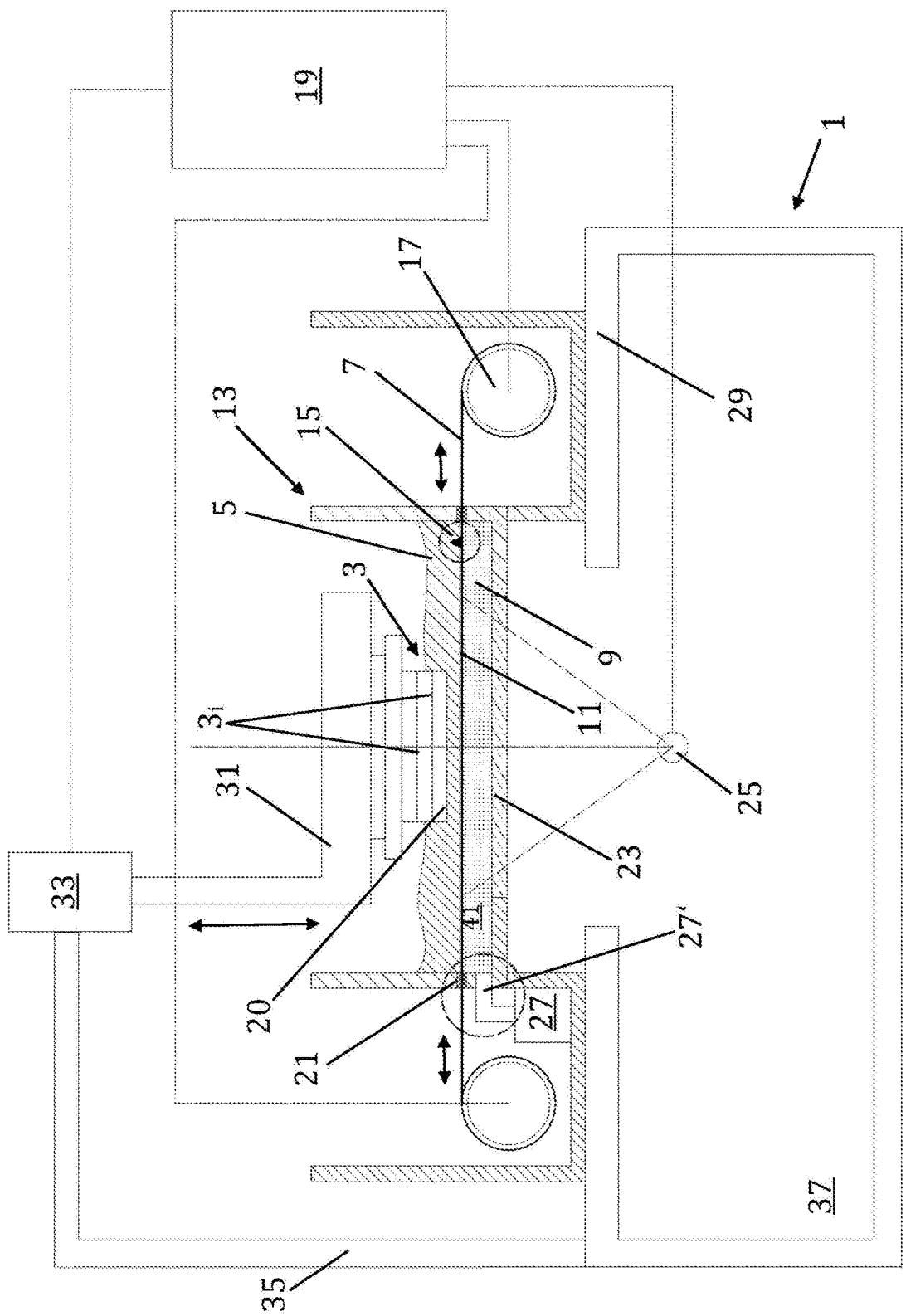
FIG. 1 a system in a schematized view.

FIG. 1 shows a system 1 for generating, i.e. constructing, a three-dimensional component or body 3 by the so-called "rapid prototyping". The body 3 can be created of individual layers $3_i$, wherein i=1, 2, 3 . . . , in a discontinuous or continuous manner from a photoreactive substance 5. The photoreactive substance 5 can be cured by a radiation with light, for instance UV light. In this regard, under the term "light" there is to be understood each kind of electromagnetic radiation which is suitable for curing the respective substance 5. The photoreactive substance 5 is for instance substantially "liquid", wherein under this term also a paste-like consistency with a random viscosity is understood.

The photoreactive substance 5 is at least partly in contact with a semipermeable layer or ply 7 which, in turn, is at least partly in contact with a second phase 9. In this connection, under the term "phase" there are understood chemical compounds of any state of aggregation, i.e. also gases, e.g. oxygen, air, apart from liquids, e.g. water or silicone oil, having any consistency, which are at least partly transparent or translucent for the radiation for the curing of the photoreactive substance 5.

The semipermeable layer 7 is at least partly permeable for the phase 9, e.g. by diffusion of oxygen, and, in this connection, comes into interaction with said phase 9 and leads to the formation of an intermediate phase 11 in the photoreactive substance 5, which has an at least restricted reactivity or up to no reactivity at all any longer and thus will not be cured by the incident radiation. The semipermeable layer 7 forms the reference surface for the stereolithography process above which the intermediate phase—formed by the diffusion of the phase 9 (e.g. air) through the layer 7 within the photoreactive substance 5—is located. In this regard, the semipermeable layer 7 is at least stretched to such a degree that it prevents the formation of an indentation pad or a deformation/displacement of the lower chemical phase 9 by the liquid mass of the photoreactive substance 5 and, thus, prevents the formation of inaccuracies by for instance a sag of the semipermeable layer 7 (reference surface). The semipermeable layer 7 is also at least partly permeable or transparent for the radiation required for the curing of the photoreactive substance 5, and it can for instance be formed by a transparent foil. The semipermeable layer 7 can also be provided in order to secure or guarantee the transport of a new photoreactive substance 5 between the component layer $3_{i-1}$ formed last and the semipermeable layer 7 or for the provision of a new intermediate phase 11. An enrichment of the semipermeable layer 7 with a phase 9 for the formation of an intermediate phase 11 can also be effected when there is no contact with the photoreactive substance 5. This can for instance be effected by a relative movement of the at least partly stretched semipermeable layer 7 with respect to the trough 13 or the component 3.

The semipermeable layer 7 has a geometric elevation, in general a driver 15, which supports the transport of the photoreactive liquid 5. By means of for instance two rollers 17 which are able to stretch or receive the semipermeable layer 7, the stretching and/or the adjustment of the semipermeable layer 7 is enabled by the presetting of the direction of rotation by a machine control or a control unit 19, see the double arrows in FIG. 1 and in FIG. 2a to FIG. 2d. By means of sealing elements 21, the emerging of a substance from the trough 13 is prevented and also a stripping off of the semipermeable layer 7 when exiting is facilitated.

Apart from a gaseous phase 9, also the use of a liquid phase 9 is possible, and the trough 13 has a transparent base plate 23 below which there is located a movable and controllable light source 25 which provides the radiation required for the curing of the photoreactive substance 5. The light source 25 can for instance be a digital mask projection device which can expose the respective component cross-section to light in a pixel-accurate manner by means of a DLP chip and an LED as a radiation source.

Figure 1A:
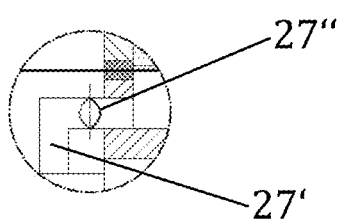
FIG. 1*a* a detail of said system.

In the system represented in FIG. 1, the phase 9 can be conveyed via a pump unit 27 by means of a conduit 27' into the trough 13 at any time. In this regard, the pump unit 27 can be designed such that it is able to facilitate an oscillation of the semipermeable layer 7 for instance by a time variation of the volume flow of the phase 9 so as to cause by a thus created vibration of the semipermeable layer 7 a (further) transport effect for the photoreactive substance 5. An oscillation of the phase 9 can for instance be effected also by a membrane 27" in the conduit 27' or in the pump unit 27, as is for instance outlined in FIG. 1a.

Above the trough 13 which rests upon a support element 29 (see FIG. 1) or is a part thereof, there is arranged a construction platform 31 which is coupled to a drive 33 which is connected to the system 1 for instance by a frame 35 and which is able to hold the formed component layers $3_1$, $3_2$, etc., and which can be lifted and lowered relative to the trough 13. Within its functional scope the control unit 19 enables various control and regulation tasks, as for instance the lifting and the lowering of the construction platform 31, the movement of the light source 25 within the power room 37 and the control of the energy input by the light source 25, the stretching as well as the movement of the semipermeable layer 7, etc.

The construction platform 31 is substantially designed such that it provides a flat plane for the adhesion of the component layers $3i$; in this regard, the construction platform 31 can also comprise geometric shapings or structures which favor the adhesion of the substance 5 or of the (uppermost) component layer(s) and at the same time minimize the displacement of the photoreactive substance 5.

When the construction platform 31 is immersed into the photoreactive substance 5 and when it is arranged by a value of the layer thickness (e.g. 100 micrometer) above the intermediate phase 11 and/or above the semipermeable layer 7, the light source 25 is activated—preferably automatically via the control unit 19. The construction platform 31 can be continuously moved upwards, and it is coupled to the light source 25 by the control 19 in a manner that a continuous construction process in dependence on the cross-sectional area of the component 3 is facilitated. If the cross-section of the component 3 has a size or an area which is unfavorable for a continuous construction process, this will be recognized and understood by the control 19 from the layer data, and a discontinuous construction process will be initiated, wherein the semipermeable layer 7 is moved for securing the transport of the photoreactive substance 5. The control 19 can determine the cross-sectional areas from the known cross-section data of the layers $3i$, which, for instance, are present in the form of several pixel-based images. This is for instance achieved by counting the pixels required for the cross-section of the body or component 3 to be generated (e.g. white pixels in a black-and-white image).

The light source 25 is adapted to enable a continuous construction process, for instance by using a pixel-controlled light source, as for instance a DLP projector, which is capable of exposing an entire area region to light all at once. Thereby the desired component layer 3*i* will be formed region-wise and selectively by a solidification of the photoreactive substance 5.

Figure 1B:
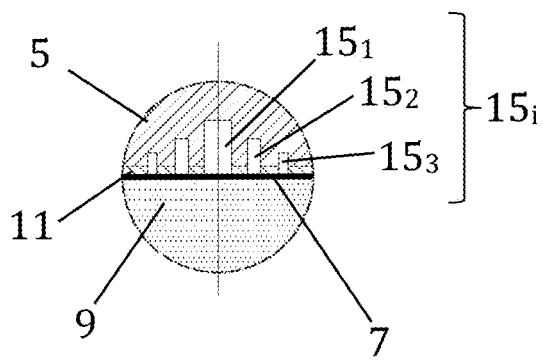
FIG. 1*b* a possible embodiment of a geometric driver elevation for the transport of a photoreactive substance in a detailed view.

The geometric elevation or the driver 15 which is favourable for the—horizontal—transport of the photoreactive substance 5 can also consist of another material than of the material of the semipermeable layer 7 and can be constructed in one part or in several parts. The at least one, e.g. rod-shaped geometric driver elevation 15 can also have a shape which differs from the triangle-shaped form which is shown in FIG. 1. For instance, the elevation 15 can also have a rectangular cross-section, or, as is represented in FIG. 1*b*, also several geometric elevations $15_1$, $15_2$, $15_3$, . . . and so on can be combined as $15_i$, can be connected in series, and can be implemented in several parts and/or stepwise, if required. Preferably, also various geometric basic forms can be taken as a basis for the generation of the geometric elevation $15_i$ or 15.

The base 23 of the trough 13 can itself have a certain permeability for the phase 9 (for instance oxygen) so as to support the formation of the intermediate phase 11, wherein at the same time a protective function in case of a failure of the semipermeable layer 7 is facilitated.

Figure 2A:
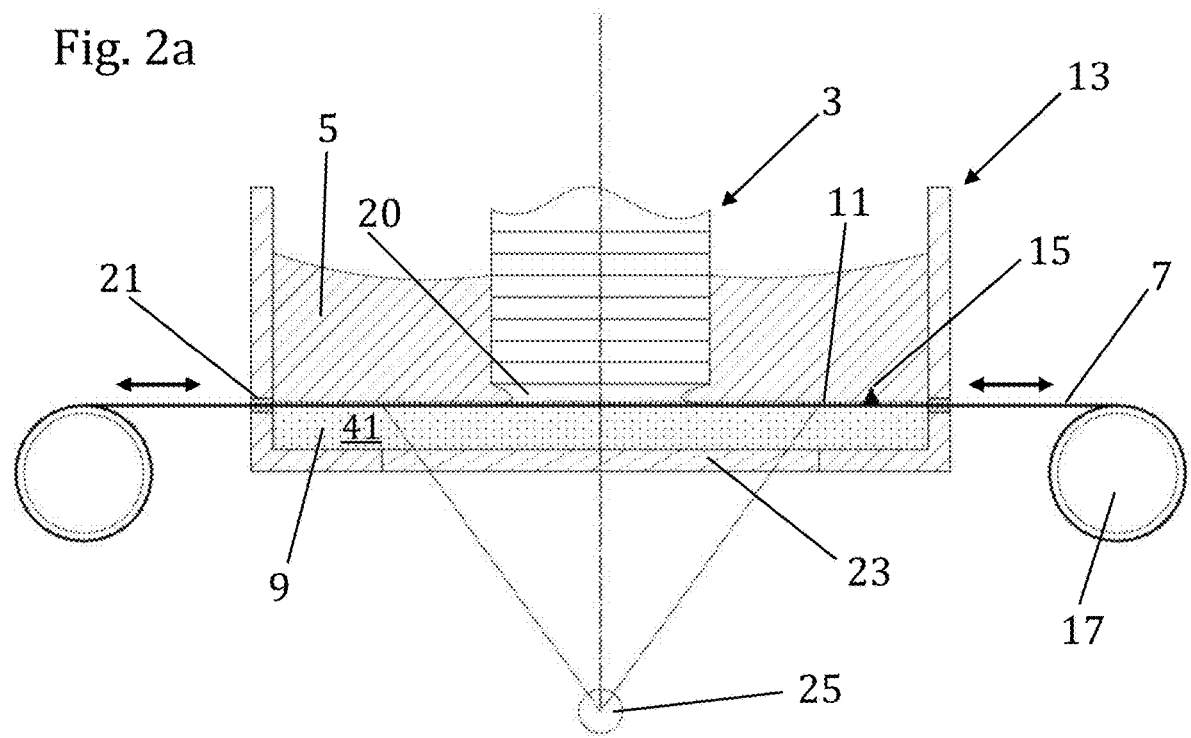
FIG. 2*a* to FIG. 2*d* the functioning of the system of FIG. 1 by means of schematic partial views which, for the purposes of a better understanding, are restricted to a relevant part and illustrate different method stages a) to d)
Figure 2B:
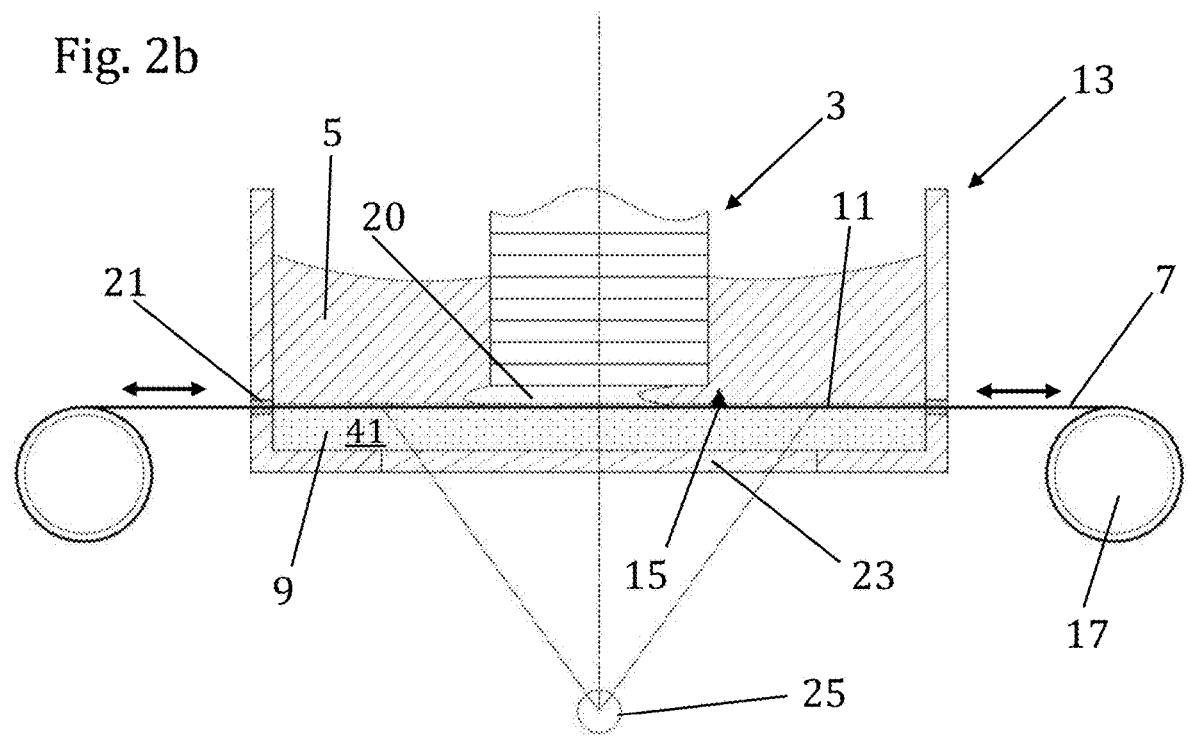

FIG. 2*a* to FIG. 2*d* partially show variants or different method stages by means of the system already described according to FIG. 1. In FIG. 2*a* the system 1 is in a position in which the layer 3, formed last is lifted by the value of the thickness of the layer to be newly formed. The component 3 has a cross-section which can no longer be produced without any active transport of a photoreactive substance 5 into the created gap 20. According to FIG. 2*b*, by the movement of the semipermeable layer 7, of the geometric driver elevation 15, as well as of the intermediate phase 11 relative to the trough 13 a flow is induced which conveys a new photoreactive substance 5 into the gap 20. Said method step will be carried out at least once.

Figure 2C:
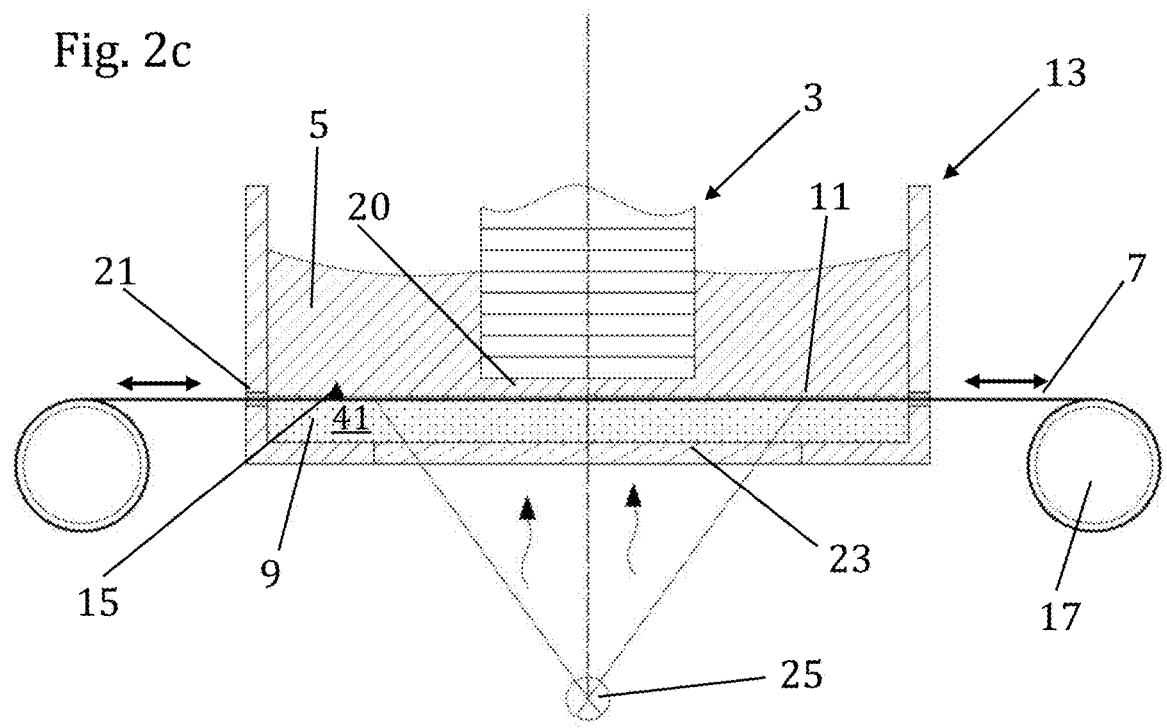

In FIG. 2*c* the transport process has already been completed, the gap 20 is completely filled with a photoreactive substance 5, and a new exposure process can be carried out which will result in the formation of the next component layer $3_i$.

Figure 2D:
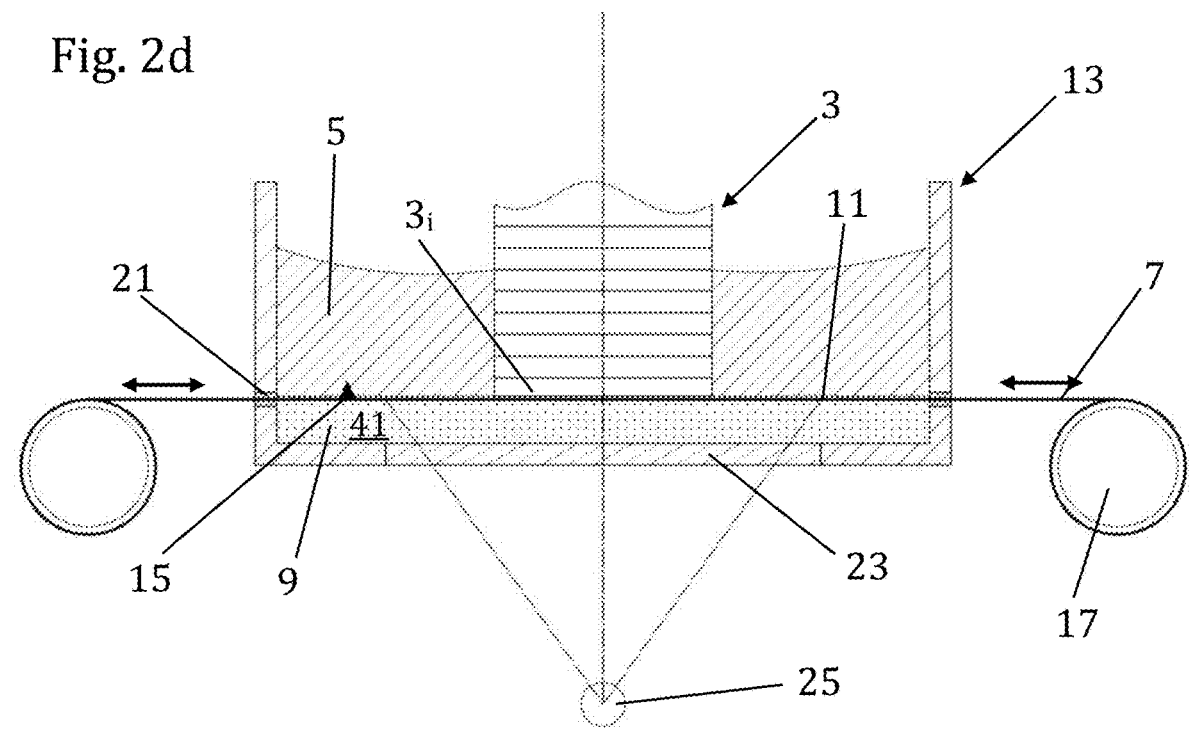

In FIG. 2*d* the finished component layer $3_i$ is represented, and subsequently thereto a lifting of the component 3 by means of the construction platform 31 by the desired layer thickness is carried out, and the process starts again.

Figure 3A:
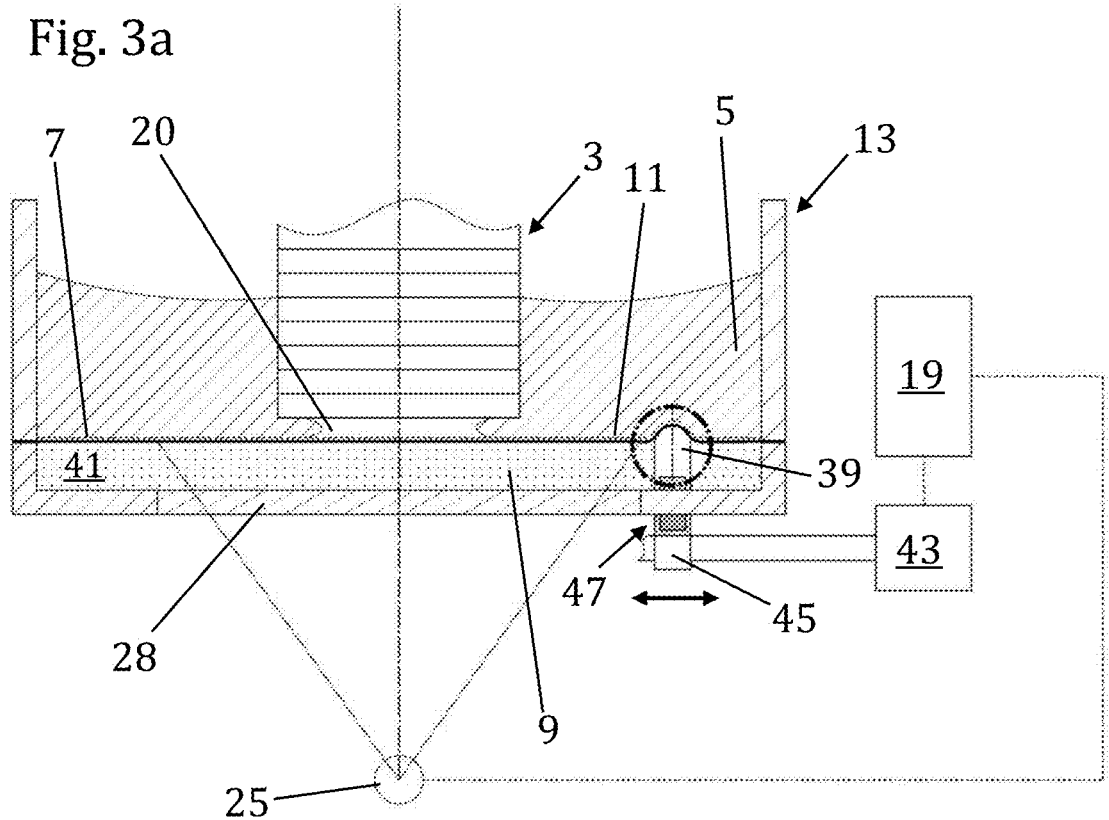
FIG. 3*a*, 3*b*, 3*c*, 3*d* the functioning of a second embodiment of the system in different stages.
Figure 3A:
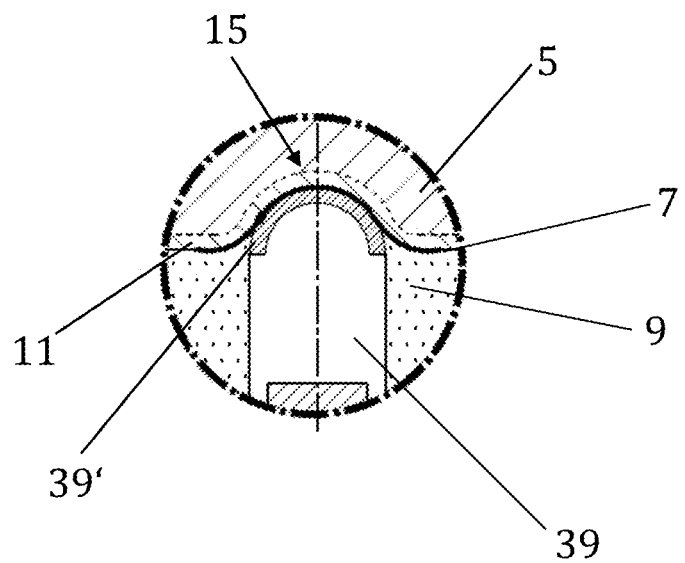
Figure 3B:
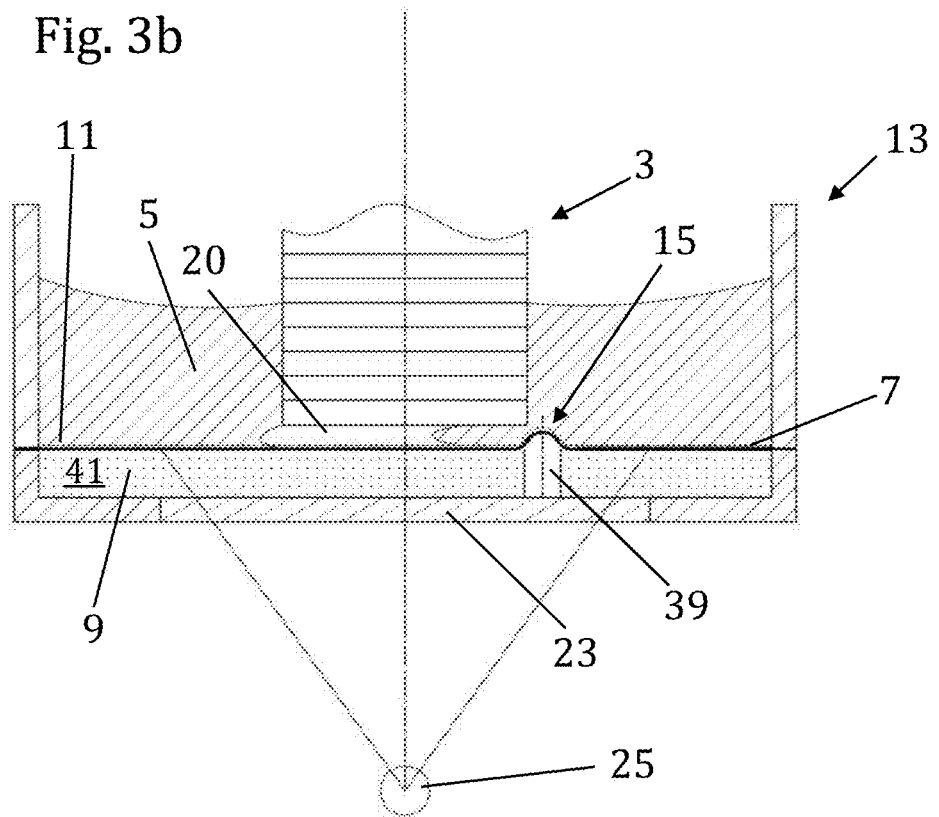
Figure 3C:
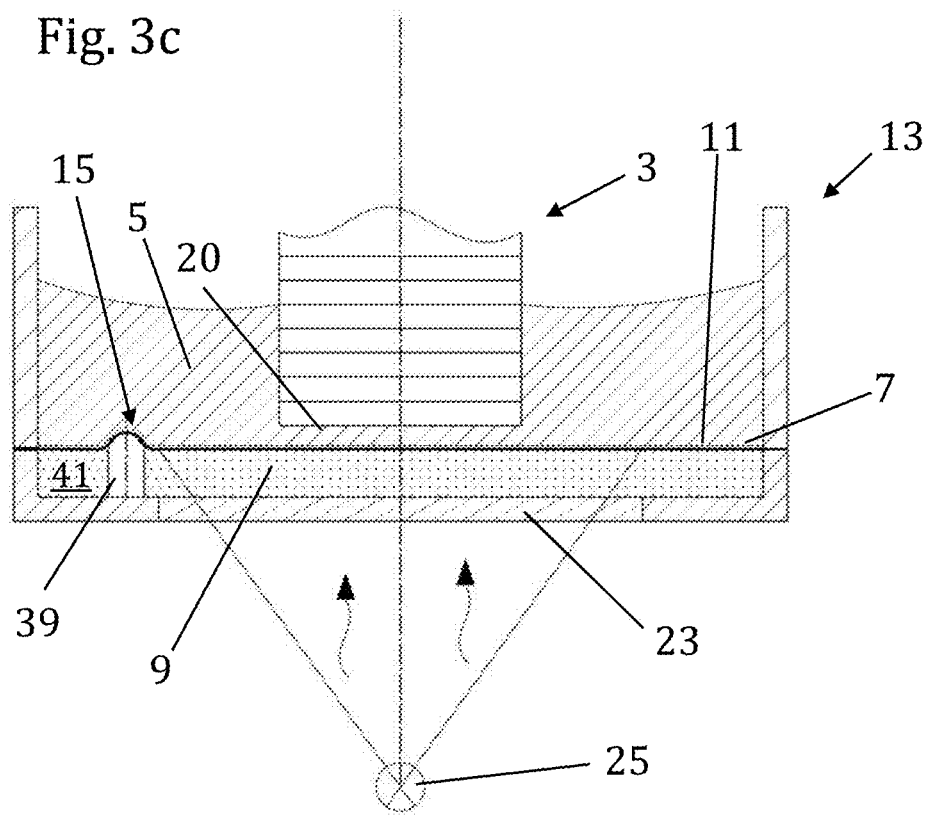

FIG. 3*a* to FIG. 3*c* show an embodiment of the system in which the semipermeable layer 7 (e.g. foil) will be stretched within and deformed by a driver pressing element 39 which can be arranged for instance below the semipermeable layer 7 within a trough chamber 41, wherein the pressing element 39 can be moved within the phase 9 at least in one direction, and, by the formation of the geometric pressing element elevation 15, will be able to facilitate a horizontal transport of the photoreactive substance 5. This is effected for instance, as is schematically represented in FIG. 3*a*, by a motor-driven linear drive 43 which has a receptacle 45 which couples the pressing element 39 with the linear axis 43 for instance via a magnetic coupling 47, wherein the control is carried out by the control unit 19. In this connection, the pressing element 39 can be guided either within the chamber 41 or also outside thereof and can be adjusted as to the height (see also FIG. 6) in order to influence the geometric elevation 15 of the semipermeable layer 7, and preferably at least one such pressing element 39 is provided. The pressing element 39 has a for instance substantially rod-shaped form which has an at least random rod-shaped cross-sectional geometry (e.g. circular, rectangular, U-shaped, etc.). In consequence, also different layer thicknesses and the conveyance of a new photoreactive substance 5 can be realized and facilitated by the adjustment of the geometric elevation 15. In this connection, the geometric elevation 15 is generated by a direct or indirect abutting of the semipermeable layer 7 at the pressing element 39; in particular, an elastic intermediate layer 39' can still be arranged between the semipermeable layer 7 and the pressing element 39 (see FIG. 3*a*'). Preferably, the geometric elevation 15 is formed by a multi-part structure of the pressing element 39 and is influenced for instance by the position of several pressing elements (for instance angle and distance with respect to each other). For instance, two substantially rectangular, rod-shaped pressing elements can be positioned at a distance and at an angle with respect to each other below the semipermeable layer 7; by means of the distance of the pressing elements the width of the geometric elevation 15 can be influenced, and by means of the angle of the rod-shaped pressing elements the height of the geometric elevation 15 can be influenced; there is obtained for instance a ramp-shaped geometric elevation. In dependence on the direction of movement, for instance the orientation of the geometric elevation can be adjusted by changing the angle of the pressing elements.

FIG. 3*a* to FIG. 3*d* show successive process steps of an exemplary design of the system which, for the generation of the geometric elevation 15 of the semipermeable layer 7, uses a pressing element 39 which is arranged below the semipermeable layer 7, can be moved relative thereto and facilitates a transport effect for the photoreactive substance 5 into the gap 20 below the body 3. The semipermeable layer 7 is stretched by the arrangement within the trough 13 at least partly, and the pressing element 39 can support the stretching of the semipermeable layer 7 by the geometric shape and height.

Figure 3D:
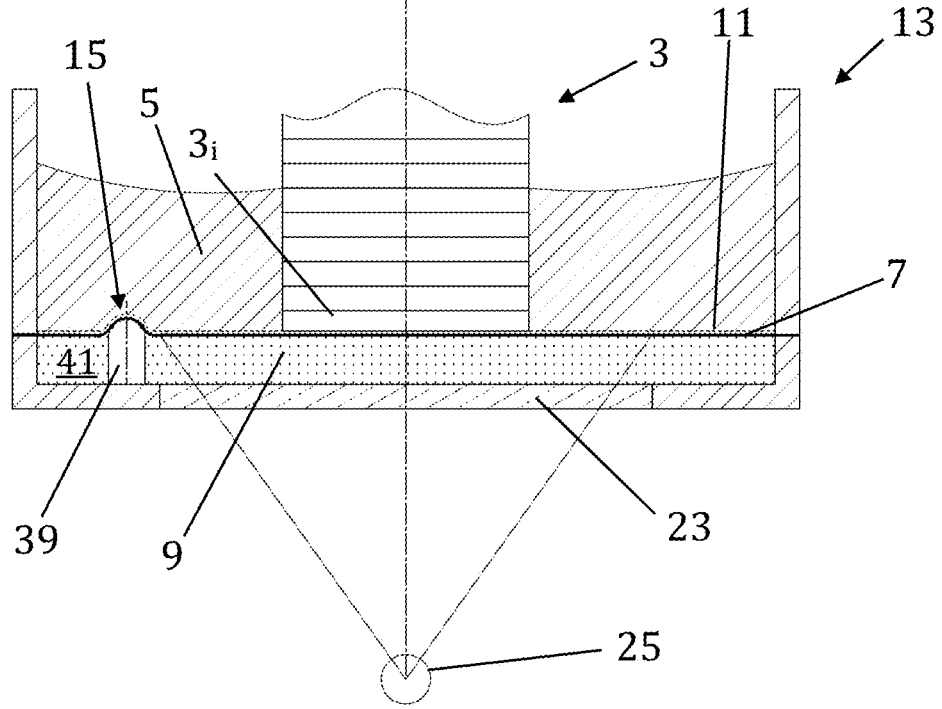

As is shown in FIG. 3*b*, by the movement of the pressing element 39 or by the movement of the geometric elevation 15 a transport effect at a substantially stationary intermediate phase 11 is achieved. In FIG. 3*c* the transport process has already been completed, the exposure process will be initiated, and a new component layer $3_i$ will be formed, as is represented in FIG. 3*d*. After the process phase as represented in FIG. 3*d* there is carried out a lifting of the just generated component layer $3_i$ relative to the trough 13, and the described process will be repeated once again.

Figure 4:
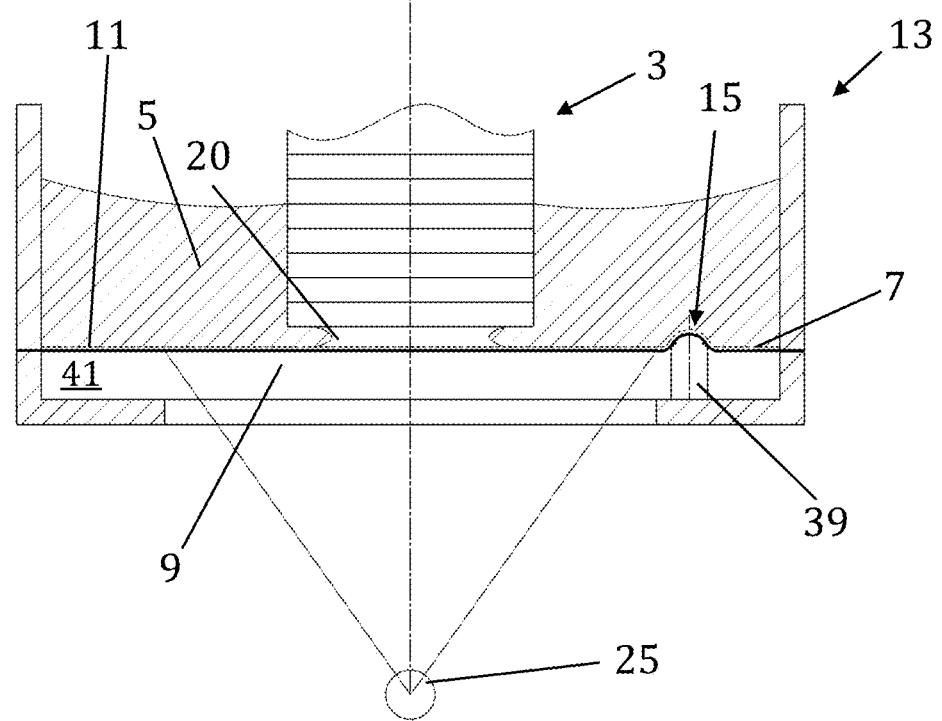
FIG. 4 a further exemplary embodiment of the invention, with a modified transport elevation which, moreover, can be realized in the first as well as also in the second embodiment.

FIG. 4 shows a modified embodiment of the system shown in FIG. 3*a* and FIG. 3*c*, wherein there is no (additional) transparent base 23 below the semipermeable layer 7; thereby a simpler diffusion of the phase 9 (for instance air or oxygen) can be facilitated, wherein at the same time the geometric elevation 15 is formed in the semipermeable layer 7 by the pressing element 39 which, here, slides in a guiding element, which is not shown in more detail, over the partly open base (23 in FIG. 3*d*).

Figure 5:
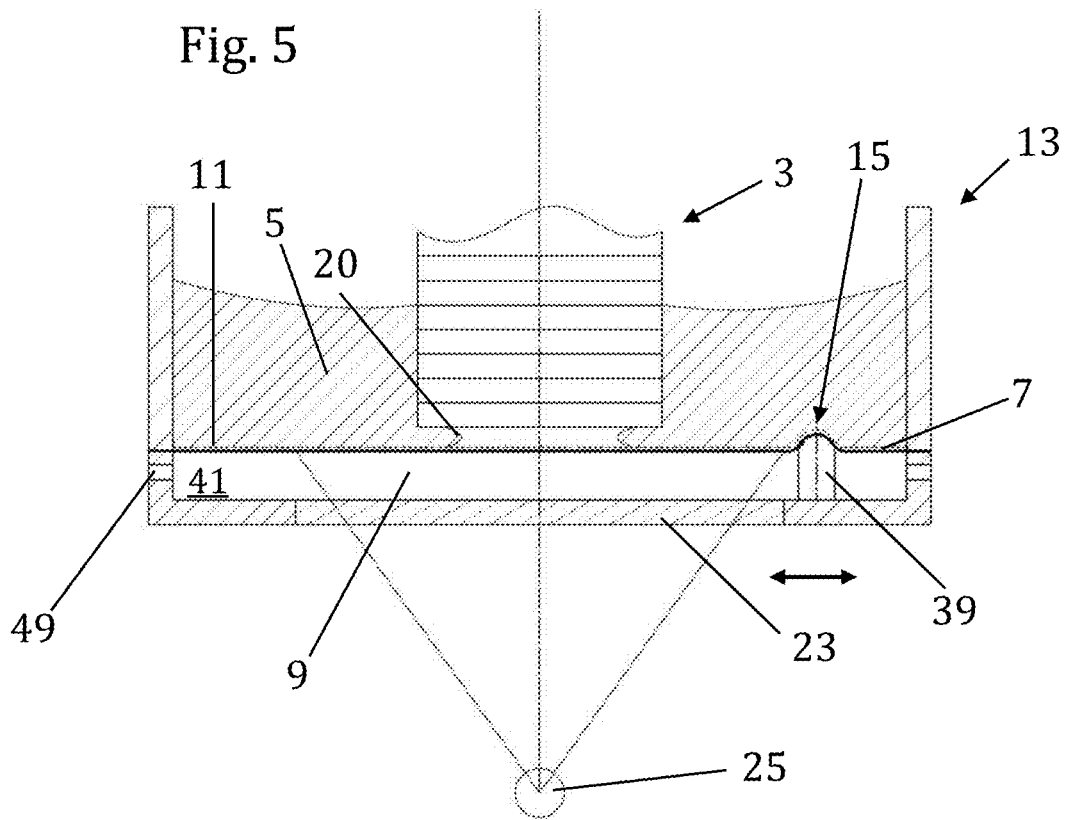
FIG. 5 an exemplary embodiment amended with respect to FIG. 4, which, however, can be used in each embodiment of the invention.

FIG. 5 shows a further variant, wherein for instance at the side surfaces of a lower chamber 41 there are arranged openings 49 through which the phase 9 (e.g. oxygen or air) can flow in and can flow out, wherein the transparent base 23 does not have to be semipermeable and wherein the pressing element 39 is guided within the chamber 41. In this connection, the pressing element 39 can, for instance as represented in FIG. 3a, be coupled to the drive by means of a magnetic coupling.

Figure 6:
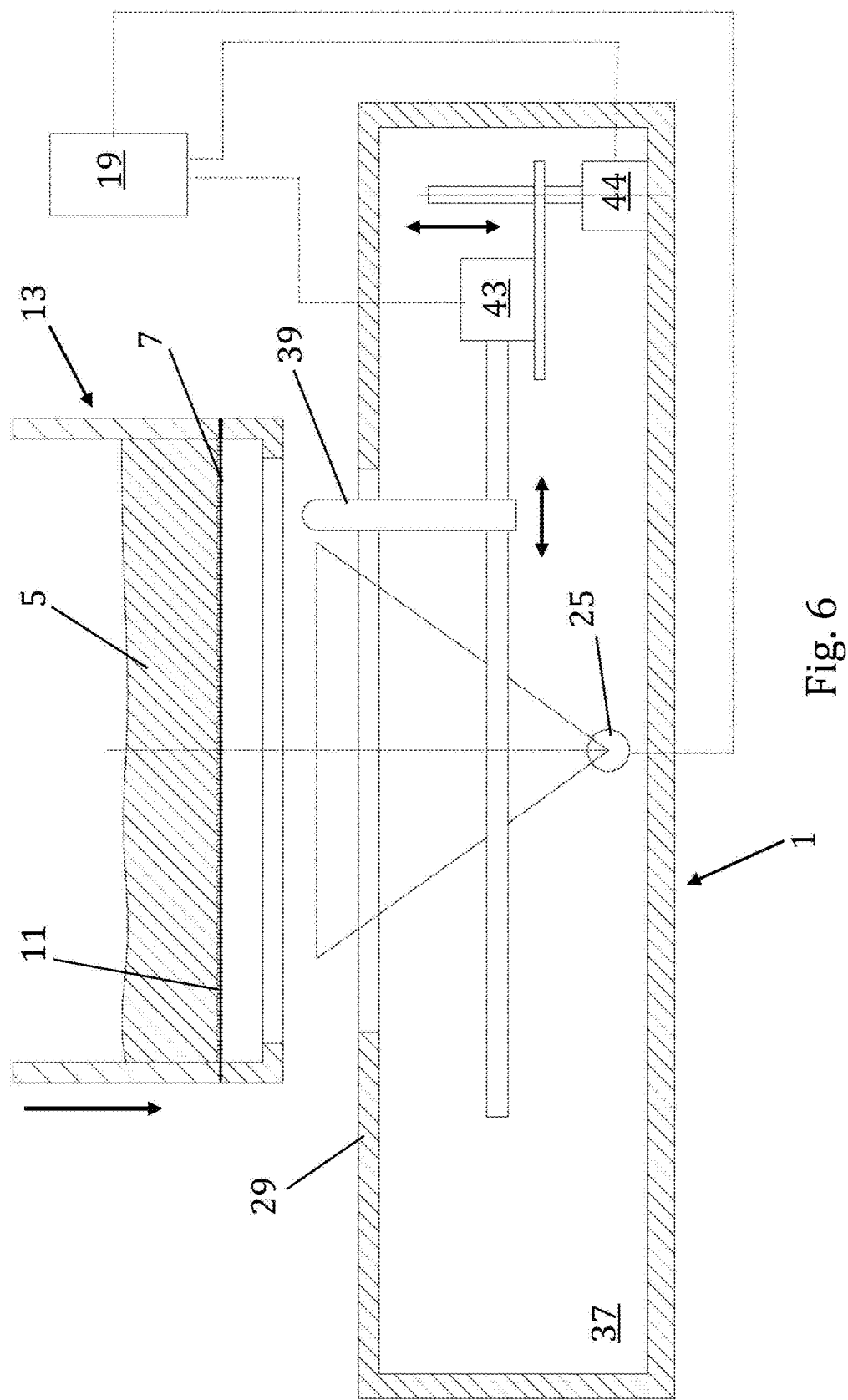
FIG. 6 a possible variant of the invention in which the transport element is a part of the system.

In a further embodiment, the driving can be carried out by a direct mechanical coupling of the pressing element 39, for instance through slits in the base plate 23 (not shown), or by omitting the base plate 23 (see FIG. 6).

As is represented in FIG. 6, the trough 13—which is shown in a lifted position therein—can also be constructed by several parts, and the pressing element 39 can already be part of the system 1. The pressing element 39 can for instance be adjusted as to the height by an additional drive 44 which is positioned in the power room 37 and is coupled for instance with a linear unit 43. By putting the trough 13 onto the support element 29 the semipermeable layer 7 will be deformed, and this leads to the formation of the geometric elevation 15, approximately like that in FIG. 5.

A further variant is shown in FIG. 7. Here, the—transparent—pressing element 39 is coupled to the light source 25 in such a way that an exposure to light can for instance be carried out also simultaneously with the movement of the pressing element 39, and a continuous exposure to light is effected, wherein, moreover, a running of the pressing element 39 ahead of the light source 25 is possible (so that here the light source will carry out the exposure to light not through the pressing element, but in parallel and in an offset state thereto). In this connection, the cross-section information generated by the light source 25 will be changed for instance by a digital pixel-based mask or by a laser scanner (as for instance a Galvano scanner, or a laser scanner with a rotating polygonal mirror wheel) according to the position and the path feed rate of the pressing element 39 and the cross-section information corresponding thereto. Such simultaneous exposure methods are known per se under the term "scrolling". In this connection, the respective information for the exposure to light of the current partial section will be provided by the control unit 19, based on the entire known cross-section information, and the position and the path feed rate of the pressing element 39 will be coordinated correspondingly with the light source 25. The pressing element 39 is preferably made of a material which is at least partially permeable or transparent for the radiation generated by the light source 25. In this connection it is particularly preferred that the exposure can be positively influenced by the geometry of the pressing element 39.

It goes without saying that the invention is not restricted to the represented and described embodiments, but rather includes all variants, modifications and combinations which fall within the scope of the invention as defined by the claims.

What is claimed is:

1. A system for constructing a component, the system comprising:
    a trough with an at least partly transparent base;
    an at least partly stretchable semipermeable layer, for receiving a photosensitive substance,
    a phase arranged below the semipermeable layer to form an intermediate layer within the photosensitive substance,
    a light source arranged below the trough base for curing the photoreactive substance in some regions, and
    a construction platform arranged above the semipermeable layer and which is liftable and lowerable with respect to the semipermeable layer for receiving the component or the individual component layers;
    at least one driver comprising a pressing element pressing against the semipermeable layer, wherein the driver extends at least from the semipermeable layer in the direction of the construction platform and is movable relative to the trough base for a transport effect to convey the photoreactive substance by an induced flow into a gap between the construction platform and the semipermeable layer.

2. The system according to claim 1, wherein height and/or shape of the pressing element is/are adjustable.

3. The system according to claim 1, wherein the semipermeable layer forms an intermediate layer or phase within the photoreactive substance by interaction with the phase arranged below the semipermeable layer, wherein a multiphase system is formed and the semipermeable layer is at least partly stretched.

4. The system according to claim 1, wherein the phase, which has any state of aggregation and density, is at least partly transparent and is able to interact with the semipermeable layer to form an intermediate phase.

5. The system according to claim 3, wherein the intermediate layer or phase is movable relative to the component.

6. The system according to claim 3, wherein the intermediate layer is at least substantially stationary.

7. The system according to claim 1, wherein the semipermeable layer is deflectable for transport of the photoreactive substance.

8. The system according to claim 1, wherein the driver is movable simultaneously together with the light source.

9. The system according to claim 1, wherein the driver is at least partly transparent.

10. The system according to claim 1, wherein the driver is made in one piece.

11. The system according to claim 1, wherein the driver is formed to be rod-shaped for transport of the photoreactive substance.

12. The system according to claim 1, wherein the semipermeable layer is flexible and is formed by a foil.

13. The system according to claim 1, wherein the semipermeable layer is movable through the trough and, in moving is stretched and fixed.

14. The system according to claim 1, wherein the semipermeable layer is mounted on at least one roller.

15. The system according to claim 14, further comprising a sealing element engaging the semipermeable layer to strip off the photoreactive substance from the semipermeable layer upon exiting the trough.

16. A system for constructing a component, the system comprising:
    a trough with an at least partly transparent base;
    an at least partly stretchable semipermeable layer, for receiving a photosensitive substance, the semipermeable layer being mounted on a first roller external of the trough;
    a phase arranged below the semipermeable layer to form an intermediate layer within the photosensitive substance;
    a light source arranged below the trough base for curing the photoreactive substance in some regions, and
    a construction platform arranged above the semipermeable layer and which is liftable and lowerable with respect to the semipermeable layer for receiving the component or the individual component layers;
    at least one driver engaging the semipermeable layer, wherein the driver extends at least from the semipermeable layer in the direction of the construction platform and is movable relative to the trough base for a transport effect to convey the photoreactive substance by an induced flow into a gap between the construction platform and the semipermeable layer.

17. The system according to claim 16, wherein the driver comprises a pressing element pressing against the semipermeable layer.

18. The system according to claim 16, further comprising a sealing element engaging the semipermeable layer to strip off the photoreactive substance from the semipermeable layer upon exiting the trough.

19. The system according to claim 16, wherein the first roller is proximate a first end of the trough, and wherein the system comprises a second roller external of the trough and proximate a second end of the trough, wherein the semipermeable layer is mounted on the first roller and the second roller.

* * * * *